Feb. 6, 1923.

J. E. ROBBINS.
HOG FEEDER.
FILED AUG. 23, 1919.

1,444,428.

2 SHEETS—SHEET 1.

Witness
Frank A. Fahle

Inventor
John E. Robbins,
By Hood & Ashley.
Attorneys

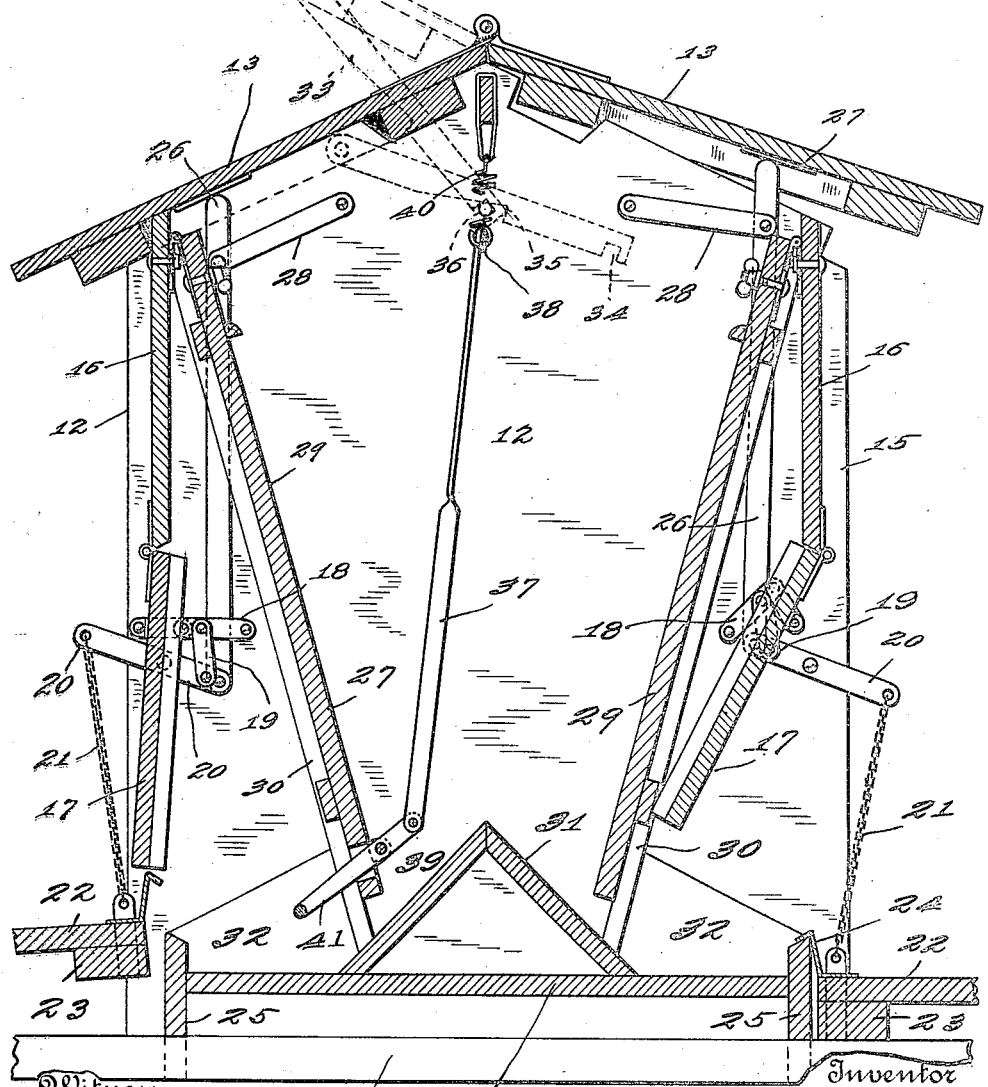

Patented Feb. 6, 1923.

1,444,428

UNITED STATES PATENT OFFICE.

JOHN E. ROBBINS, OF GREENSBURG, INDIANA.

HOG FEEDER.

Application filed August 23, 1919. Serial No. 319,364.

*To all whom it may concern:*

Be it known that I, JOHN E. ROBBINS, a citizen of the United States, residing at Greensburg, in the county of Decatur and State of Indiana, have invented a new and useful Hog Feeder, of which the following is a specification.

It is the object of my invention to provide an automatic hog feeder, whereby clogging of the feeder is prevented, and whereby the cover for the bin serves also as a counterweight for the pivoted hog platform.

Figure 1:
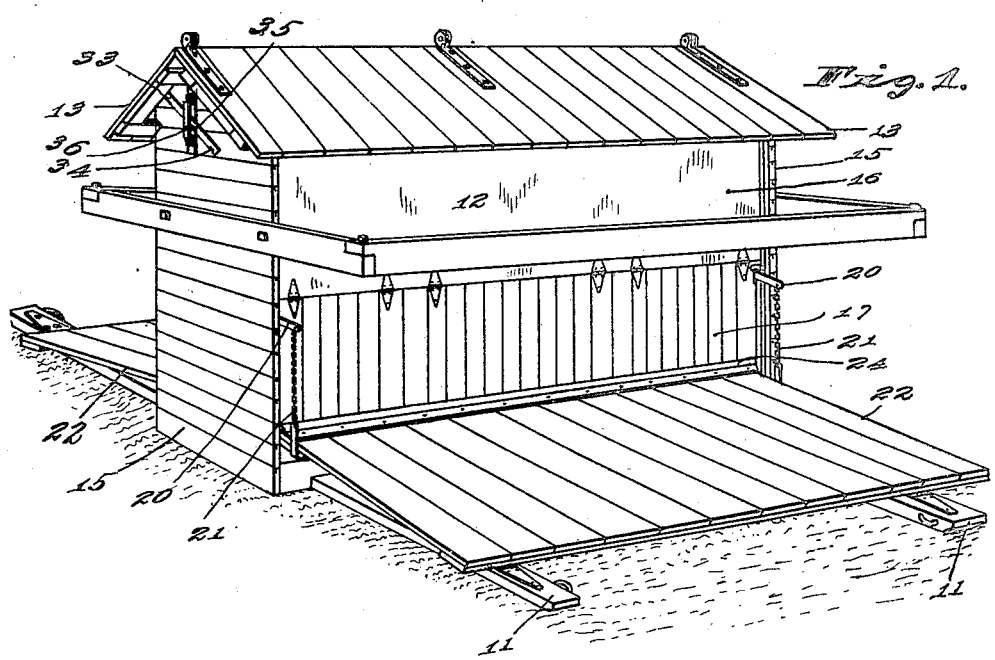
Figure 3:
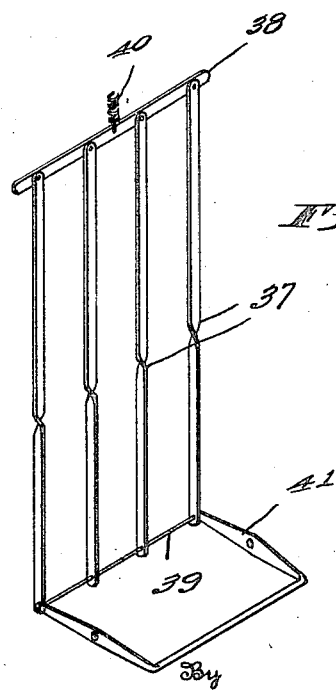

The accompanying drawings illustrate my invention. In such drawings, Fig. 1 is a perspective view of a hog feeder embodying my invention; Fig. 2 is a transverse vertical section through such hog feeder, parts of the hog platforms being broken away; and Fig. 3 is a perspective view of the agitator.

Centrally mounted on a base formed by transverse beams 11, which may serve as sled runners, is a storage bin 12, which is provided with a gable roof of which the two parts are hinged at the top to provide covers 13 which can be lifted to supply feed to the bin. The bin is formed of a floor 14, end walls 15, and side walls formed of fixed upper portions 16 extending between the end walls 15 and hinged door portions 17 pivoted at their upper edges to the lower edges of said fixed portions 16. At each end, each door 17 is connected by a toggle 18 to a fixed point on the end wall 15 so that by the manipulation of such toggle the doors may be swung inward or outward, and so that when the toggles are straightened the doors are locked against being pushed inward. The toggles 18 near their middles are connected by links 19 to the inner ends of levers 20, also pivotally mounted on the end wall 15. The outer ends of such levers 20 are connected by chains 21 to the inner corners of swinging platforms 22 which are hinged at their outer edges to the beams 11 near the ends of the latter and upon which the hogs must step in order to reach the feed in the bin. The downward movement of the platforms 22 is limited by cross-beams 23 fastened to the under side of their inner edges in position to strike the beams 11. Each platform 22 is provided at its inner edge with a sheet metal guard plate 24, which is fastened to the platform as by screws or nails and projects obliquely upward, then over the short bottom board 25 which projects up a short distance past the edge of the floor, and then downward, preferably obliquely, the upper edge of the bottom board 25 being cut correspondingly obliquely so that when the platform 22 is depressed by having a hog upon it the guard plate 24 swings down upon and closely fits against the upper edge of the bottom board 25 to prevent the hog from rooting out the feed into the space between the platform 22 and the bottom board. The door 17 is of such height that when the platform 22 is raised the guard plate 24 lies closely beneath the lower edge of such door. The inner ends of the levers 20 are connected to vertically extending rods 26, which project upward beneath suitable wear plates 27 on the under sides of the covers 13. The upper ends of the rods 26 may be guided by swinging arms 28 suitably pivoted to the end walls 15.

When the platform 22 is depressed, it swings the associated levers 20 to operate the toggle 18 and cause the associated doors 17 to swing inward, so that the hog which is depressing the platform may have access to the grain behind the bottom board 25. In addition, the depressing of the platform 22 raises the associated rods 26, which as they rise lift the associated cover 13, as shown in the right-hand half of Fig. 2. The weight of the cover 13 is such that it predominates over the weight of the platform 22 when the latter has no hog thereon, so that the cover 13 serves as a counterweight and acts to raise the platform 22 when the hog steps off such platform, thus closing the door 17 by straightening the toggles 18.

Pivoted to the inner faces of the upper portions 16 of the side walls are slanting partitions 29, against which the feed within the bin 12 rests. The outward movement of these slanting partitions 29 is limited by suitable stop pieces 30 on the end walls 15. The lower edges of the slanting partitions 29 come down close to an inverted V-shaped partition 31 running along the center of the floor 14, but there is a sufficient space between the partition 29 and 31 to allow the feed from the bin 13 to pass through into the feeding space between the partition 29 and the bottom boards 25. In these feeding spaces are cross partitions 32, for minimizing the rooting out of the feed by the hog by preventing him from nosing along such feeding space for more than a limited distance. When the platform 22 is depressed, and an adjacent door 17 is swung inward, the lower edge of such door 17 strikes the slanting partition 29 near its lower edge and jars such partition, to jar down any feed which may have tended to clog in the bin. In addition, when the hog steps off the platform 22 there is a farther jaring action when the cover 13 strikes the upper edges of the side and end walls 16 and 15.

Each cover 13 is provided with a swinging arm 33, which is provided with notches 34 and 35 on its under edge to co-operate with a pin 36 projecting outward from the end wall 15. When the cover 13 is raised, the notch 34 is made to receive the pin 36 to hold the cover open while the bin is being filled. To lower the cover, the swinging arm 33 is lifted so that the notch 34 clears the pin 36. When the cover 13 is down, the pin 36 rides in the notch 35, which is of sufficient length to allow that movement of the cover 13 which is caused by the movement of the platform 22 while preventing the cover 13 from being lifted farther than that unless the arm 33 is lifted to separate the notch 35 from the pin 36.

Mounted within the bin is an agitator comprising a series of upright rods 37 connected by upper and lower cross-rods 38 and 39. The upper cross-rod 38 is swung from a supporting spring 40 suitably supported within an upper part of the bin. The lower cross-rod 39 is connected at its ends to a U-shaped member 41 which is pivoted to the lower edge of one of the slanting partitions 29 so that the base part of the U-shaped member 41 is in the feeding space from which the hogs eat. As a result, a hog when feeding agitates this U-shaped member, and jiggles the agitator up and down to stir up the feed within the bin and prevent it from clogging. This stirring action assists the jarring action of the door 17 when it strikes the partition 29 and of the cover 13 when it strikes the end and side walls of the bin, to prevent clogging of the feed in the bin. The agitator may be provided on one or both sides, though it is shown only on one side as that is found to be ordinarily sufficient.

I claim as my invention:

1. A feeding device, comprising a movable platform operable downward by the weight of an animal, and a feed bin provided with a swinging door and a swinging cover both of which are connected to said platform so that when the platform is pressed downward the door is swung open and the cover swung upward, said cover serving as a counterweight tending to raise the platform.

2. A feeding device, comprising a movable platform operable downward by the weight of an animal, and a feed bin provided with a swinging door and a swinging cover both of which are connected to said platform so that when the platform is pressed downward the door is swung open and the cover swung upward, said cover serving as a counter weight tending to raise the platform, said bin being provided with members which are struck by the door and the cover in their movements to produce jarring to prevent clogging.

3. A feeding device, comprising a bin having a swinging cover, a movable platform operable downward by the weight of an animal attempting to feed at the bin, a swinging door connected to said platform to be opened thereby when the platform is swung downward, and connections between said platform and said cover whereby the cover serves as a counterweight tending to raise the platform but is itself raised when the platform is depressed.

4. A feeding device, comprising a bin having a swinging cover, a movable platform operable downward by the weight of an animal attempting to feed at the bin, a swinging door connected to said platform to be opened thereby when the platform is swung downward, and connections between said platform and said cover whereby the cover serves as a counterweight tending to raise the platform but is itself raised when the platform is depressed, said connections to the cover being separable to allow the cover to be opened to permit filling of the bin.

5. A feeding device, comprising a bin having a swinging cover, a movable platform operable downward by the weight of an animal attempting to feed at the bin, a swinging door connected to said platform to be opened thereby when the platform is swung downward, and connections between said platform and said cover whereby the cover serves as a counterweight tending to raise the platform but is itself raised when the platform is depressed, said bin being provided with parts which are struck and jarred by said cover when the latter falls to lift the platform.

6. A feeding device, comprising a feed bin with filling and feeding openings and having a swinging cover for the filling opening, a movable platform operable downward by the weight of an animal attempting to feed at said bin, and connections between said platform and said cover whereby the latter serves as a counterweight which is raised when the platform is depressed and which tends to return the platform to normal position.

7. A feeding device, comprising a feed bin with filling and feeding openings and having a swinging cover for the filling opening, a movable platform operable downward by the weight of an animal attempting to feed at said bin, and connections between said platform and said cover whereby the latter serves as a counterweight which is raised when the platform is depressed and which tends to return the platform to normal position; said bin being provided with parts which are struck and jarred by said cover when the latter falls to raise the platform.

8. A feeding device, comprising a feed bin having a swinging cover, a movable platform operable downward by the weight of an animal attempting to feed at said bin, connections between said platform and said cover whereby the latter serves as a counterweight which is raised when the platform is depressed and which tends to return the platform to normal position, and a swinging arm connected to said cover and having notches co-operating with a pin carried by said bin, one of said notches serving to hold the cover in the raised position for filling and the other permitting that movement of the cover which is associated with the movement of the platform but preventing raising of the cover farther unless said notch is separated from said pin.

9. In a feeding device, the combination of a feed bin provided with a feeding space and a partition under which feed passes to said feeding space, an agitator mounted within said bin, a helical suspension spring supporting said agitator, and a pivotally mounted movable member connected to said agitator to operate it and having a portion located in said feeding space so that it is moved by the action of animals in attempting to get feed from said feeding space.

10. In a feeding device, the combination of a feed bin, a movable platform operable downward by the weight of an animal attempting to feed at the bin, means operable by said platform for jarring the feed bin on both upward and downward movements of the platform, and an agitator arranged within the bin to agitate the feed therein and provided with an operating member arranged within the feeding space of the bin so as to be moved by an animal feeding thereat.

11. In a feeding device, the combination of a feed bin, a movable platform operable downward by the weight of an animal attempting to feed at the bin, means operable by said platform for jarring the feed bin, and an agitator arranged within the bin to agitate the feed therein and provided with an operating member arranged within the feeding space of the bin so as to be moved by an animal feeding thereat.

In witness whereof, I JOHN E. ROBBINS, have hereunto set my hand at Greensburg, Indiana, this 16th day of August, A. D. one thousand nine hundred and nineteen.

JOHN E. ROBBINS.